(12) United States Patent
Yano (10) Patent No.: US 11,075,770 B2
(45) Date of Patent: Jul. 27, 2021

(54) SEMICONDUCTOR DEVICE AND SECURITY SYSTEM

(71) Applicant: Winbond Electronics Corp., Taichung (TW)

(72) Inventor: Masaru Yano, Taichung (TW)

(73) Assignee: Winbond Electronics Corp., Taichung (TW)

( * ) Notice: Subject to any disclaimer, the term of this patent is extended or adjusted under 35 U.S.C. 154(b) by 0 days.

(21) Appl. No.: 16/725,345

(22) Filed: Dec. 23, 2019

(65) Prior Publication Data

US 2020/0136841 A1    Apr. 30, 2020

Related U.S. Application Data

(62) Division of application No. 15/710,358, filed on Sep. 20, 2017, now Pat. No. 10,554,422.

(30) Foreign Application Priority Data

Sep. 20, 2016 (JP) .............................. JP2016-182782

(51) Int. Cl.
*H04L 9/32* (2006.01)
*G11C 29/00* (2006.01)
(Continued)

(52) U.S. Cl.
CPC .............. *H04L 9/3278* (2013.01); *G09C 1/00* (2013.01); *G11C 7/04* (2013.01); *G11C 16/22* (2013.01);
(Continued)

(58) Field of Classification Search
CPC .................................................... H04L 9/3278
See application file for complete search history.

(56) References Cited

U.S. PATENT DOCUMENTS 8,510,608 B2    8/2013 Futa et al.
8,525,169 B1 *  9/2013 Edelstein .............. H04L 9/3247
257/48
(Continued)

FOREIGN PATENT DOCUMENTS

CN         104598793 A    5/2015
EP           2773061 A2    9/2014
(Continued)

OTHER PUBLICATIONS

Potkonjak et al., "Public Physical Unclonable Functions," Proceedings of the IEEE, vol. 102, Iss. 8, Aug. 2014, pp. 1142-1156, 15 pages.

(Continued)

*Primary Examiner* — Bradley W Holder
(74) *Attorney, Agent, or Firm* — Muncy, Geissler, Olds & Lowe, P.C.

(57) ABSTRACT

A semiconductor device is provided. The semiconductor device includes a unique-information generation portion, a detection portion, a memory portion, and a readout portion. The unique-information generation portion operates in a plurality of operation environments to generate unique information. The unique information includes stable information and unstable information. The stable information is constant in the plurality of operation environments, and the unstable information is different in at least two of the plurality of operation environments. The detection portion detects the unstable information. The memory portion stores the unique information and identification information for identifying the unstable information. The readout portion reads out the unique information and the identification information and outputs the unique information and the identification information to an external portion.

9 Claims, 7 Drawing Sheets

(51) Int. Cl.
*G11C 7/04* (2006.01)
*G11C 29/12* (2006.01)
*G11C 16/22* (2006.01)
*G09C 1/00* (2006.01)
*H04L 9/34* (2006.01)
*G11C 29/46* (2006.01)

(52) U.S. Cl.
CPC .......... *G11C 29/00* (2013.01); *G11C 29/1201* (2013.01); *H04L 9/3226* (2013.01); *H04L 9/34* (2013.01); *G11C 29/46* (2013.01)

(56) References Cited

U.S. PATENT DOCUMENTS

| | | | |
|---|---|---|---|
| 9,262,256 | B2 | 2/2016 | Mathew et al. |
| 9,276,583 | B1 | 3/2016 | Satpathy et al. |
| 9,425,803 | B1 | 8/2016 | Duncan et al. |
| 9,934,411 | B2 | 4/2018 | Kwong et al. |
| 2013/0234771 | A1 | 9/2013 | Simons et al. |
| 2014/0266296 | A1 | 9/2014 | Wang et al. |
| 2015/0067895 | A1 | 3/2015 | Vasyltsov et al. |
| 2015/0092939 | A1* | 4/2015 | Gotze ................. H04L 9/0866 380/2 |
| 2015/0143130 | A1 | 5/2015 | Ducharme et al. |
| 2015/0178143 | A1* | 6/2015 | Mathew .................. G06F 7/00 714/5.1 |
| 2016/0065378 | A1* | 3/2016 | Kim ..................... H04L 9/0866 713/184 |
| 2016/0087805 | A1 | 3/2016 | Li et al. |
| 2016/0182045 | A1 | 6/2016 | Mai et al. |
| 2016/0285639 | A1 | 9/2016 | Mathew et al. |

FOREIGN PATENT DOCUMENTS

| | | |
|---|---|---|
| JP | 2010122774 A1 | 6/2010 |
| JP | 2014506095 A | 3/2014 |
| JP | 2015080252 A | 4/2015 |
| JP | 2016012931 A | 1/2016 |
| WO | WO 2011/118548 A1 | 9/2011 |

OTHER PUBLICATIONS

Tehranipoor et al., "DRAM basec Intrinsic Physical Unclonable Functions for System Level Security," Proceeding GLSVLSI '15 Proceedings of the 25$^{th}$ edition of Great Lakes Symposium on VLSI, pp. 15-20, 2015, 6 pages.

Japanese Office Action dated Jun. 5, 2018, issued in JP2016-182782, with English translation, 10 pages.

Price et al., "How to Generate Repeatable Keys Using Physical Unclonable Functions," Department of Computer Science an Electrical Engineering, pp. 1-6, IACR Cryptology ePrint Archive 2014 (2014), 9 pages.

* cited by examiner

| operation temperature | addresses | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| room temperature | 0 | 1 | 0 | 0 | 1 | 0 | 1 | 0 | 0 | 1 | 0 | 1 | 1 | 0 | 0 | 1 |
| high temperature | 0 | 0 | 0 | 0 | 1 | 0 | 1 | 0 | 0 | 1 | 0 | 1 | 1 | 0 | 0 | 1 |
| low temperature | 0 | 1 | 0 | 0 | 1 | 1 | 1 | 0 | 0 | 1 | 0 | 1 | 0 | 0 | 0 | 1 |

FIG. 3A

| operation temperature | addresses | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | A | B | C | D | E | F |
| room temperature | 0 | 1 | 0 | 0 | 1 | 0 | 1 | 0 | 0 | 1 | 0 | 1 | 1 | 0 | 0 | 1 |
| high temperature | 0 | 0 | 0 | 0 | 1 | 0 | 1 | 0 | 0 | 1 | 0 | 1 | 1 | 0 | 0 | 1 |
| low temperature | 0 | 1 | 0 | 0 | 1 | 1 | 1 | 0 | 0 | 1 | 0 | 1 | 0 | 0 | 0 | 1 |
| codes | 0 | x | 0 | 0 | 1 | x | 1 | 0 | 0 | 1 | 0 | 1 | x | 0 | 0 | 1 |

SEMICONDUCTOR DEVICE AND SECURITY SYSTEM

CROSS REFERENCE TO RELATED APPLICATIONS

The present application is a divisional application of and claims priority from U.S. patent application Ser. No. 15/710,358, filed Sep. 20, 2017, which claims priority of Japan Patent Application No. JP2016-182782, filed on Sep. 20, 2016, the entirety of which is incorporated by reference herein.

BACKGROUND OF THE INVENTION

Field of the Invention

The invention relates to a semiconductor device with function for generating unique information, and more particularly to a method for generating unique information by circuit elements of a semiconductor device.

Description of the Related Art

In recent years, with the strengthening of the security of semiconductor devices and electronic devices, countermeasures against counterfeiting and cloning of semiconductor devices mounted thereon are required. In one method, unique information is given to a semiconductor device, and when the unique information is authenticated, the semiconductor device is considered as an authentic object, and the semiconductor device or the electronic device is allowed to operate. The unique information can be stored in, for example, a non-volatile memory of a semiconductor device or the like. However, with this method, there is risk that the unique information can be read by analyzing the semiconductor device or by illegally accessing the semiconductor device from the outside.

Therefore, in recent years, PUF (Physical Unclonable Function) technology has attracted attention, wherein physical copying is not allowed. PUF technology uses unpredictable physical information with high confidentiality and permanency as unique information. For example, Patent Document 1 (Japanese Patent Publish No. 2015-80252) discloses a digital value generating apparatus and method for generating unique digital values according to process variations of semiconductor elements thereof. Patent Document 2 (Japanese Patent Publish No. 2016-12931) discloses a semiconductor device in which unique information is read from a memory region corresponding to a unique code of a specific element generated by a peculiar-code generation portion.

BRIEF SUMMARY OF THE INVENTION

However, in cases where unique digital values are generated according to process variations of semiconductor elements thereof as disclosed in Patent Document 1, it is difficult to determine "0" or "1" if variations in the semiconductor elements are small. On the other hand, if the margin for the determination is made larger, the randomness (non-predictability) of the unique information may degrade. One object of the present invention is to provide a semiconductor device which can solve such problems in the prior art and improve upon methods for generating unique information.

An exemplary embodiment of a semiconductor device is provided. The semiconductor device comprises a unique-information generation portion, a detection portion, a memory portion, and a readout portion. The unique-information generation portion operates in a plurality of operation environments to generate unique information. The unique information comprises stable information and unstable information. The stable information is constant in the plurality of operation environments, and the unstable information is different in at least two of the plurality of operation environments. The detection portion detects the unstable information. The memory portion stores the unique information and identification information for identifying the unstable information. The readout portion reads out the unique information and the identification information and outputs the unique information and the identification information to an external portion.

An exemplary embodiment of a security system is provided. The security system comprises the semiconductor device described above and a host device. The host device is coupled to the semiconductor device. The host device comprises a storage portion, an information receiving portion, and an authentication portion. The storage portion stores the unique information and the identification information received from the semiconductor device. The information receiving portion receives the unique information and the identification information from the unique-information generation portion of the semiconductor device. The authentication portion compares the stable information of the unique information stored in the storage portion with the stable information of the unique information obtained from the information receiving portion to authenticate the semiconductor device.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

In the following, embodiments of the present invention will be described in detail with reference to the drawings. A semiconductor device of the present invention generates unique information of the semiconductor device and corresponds to a security system which uses the unique information. Except for the function of generating the unique information, the semiconductor device of the present invention is not limited to having specific functions. The semiconductor device of the present invention may be a semiconductor memory, a semiconductor logic, a semiconductor processing circuit, a semiconductor driving circuit, a central processing circuit, or the like. The semiconductor device 200 may be used in any device requiring security, such as an IC card medium (for example, a SIMM card, a credit card, a card with built-in IC), a mobile terminal (for example, a smartphone), a computer, or other electronic devices.

Figure 1A:
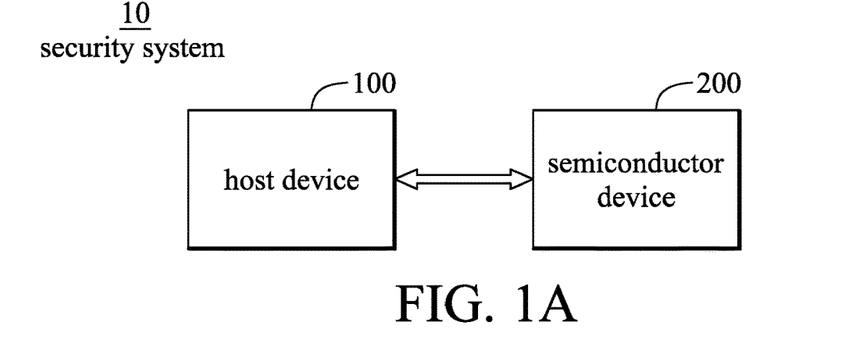
FIG. 1A is a schematic view showing a security system according to an exemplary embodiment.

FIG. 1A is a schematic view showing a security system according to an exemplary embodiment. A security system 10 includes, for example, a host device 100 and a semiconductor device 200 coupled to the host device 100 by wired or wireless connection. By using unique information generated by the semiconductor device 200, the host device 100 authenticates whether the semiconductor device 200 is authentic (whether the semiconductor device 200 is an unauthorized object). In one example, the host device 100 can use the semiconductor device 200 only in cases where the host device 100 is able to authenticate the semiconductor device 200, that is, the host device 100 cannot use the semiconductor device 200 in cases where the host device 100 is not able to authenticate the semiconductor device 200. The host device 100 includes, for example, a computer device, a computer system, a microcontroller, a microcomputer, and the like without limitation to the present invention.

The semiconductor device 200 generates unique information by using circuits or circuit elements included in the semiconductor device 200. The semiconductor device 200 may include, for example, various circuit elements (such as transistors, resistors, capacitors, etc.) on a silicon substrate or another substrate (such as SiC, GaAs, sapphire, etc.). A circuit element in a respective semiconductor device has specific characteristics. For example, it may have characteristics that are peculiar to a semiconductor device, for example, the threshold value of a transistor in a semiconductor device is different from the threshold value of a transistor of another semiconductor device. Thus, unique information of a semiconductor device can be obtained from the circuit elements of the semiconductor device.

When the host device 100 is connected to the semiconductor device 200, the host device 100 receives unique information from the semiconductor device 200 and performs authentication for the semiconductor device 200 based on the unique information. The authentication may be performed at any time, for example, when the semiconductor device 200 is initially connected to the host device 100, or when the host device 100 receives a request from the user.

Figure 1B:
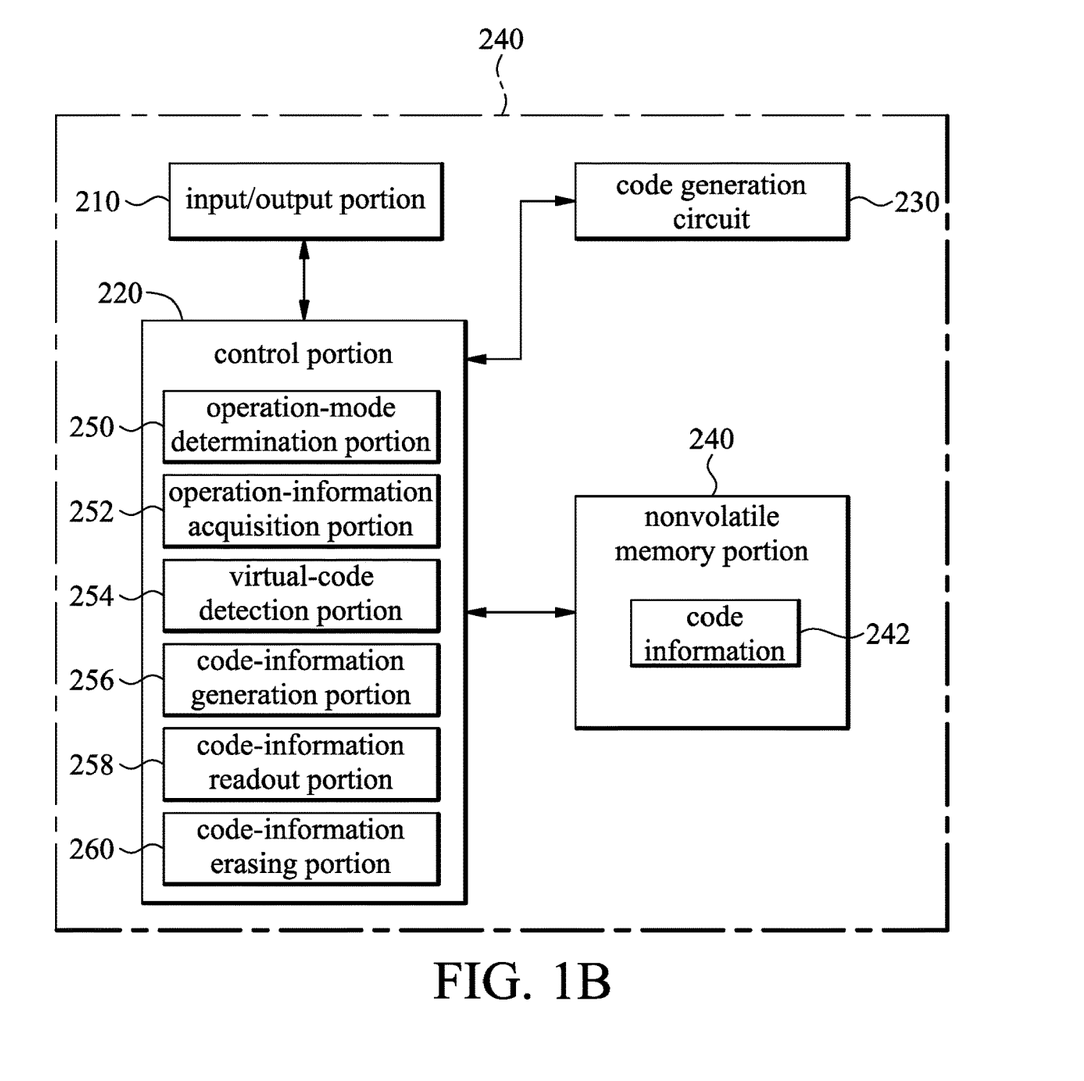
FIG. 1B is a block diagram showing a configuration of main portions of the semiconductor device according to an exemplary embodiment.

FIG. 1B is a block diagram showing a configuration of main portions of the semiconductor device 200 according to an exemplary embodiment. The semiconductor device 200 includes an input/output portion 210 for exchanging data with the host device 100, a control portion 220, a code generation circuit 230 for generating codes of unique information, and a nonvolatile memory portion 240. Also, the structure illustrated here is an example, and the semiconductor device 200 may have other structure.

In a preferred embodiment, the control portion 220 may include an operation-mode determination portion 250, an operation-information acquisition portion 252, a virtual-code detection portion 254, a code-information generation portion 256, a code-information readout portion 258, and a code-information erasing portion 260. The operation-mode determination portion 250 determines the operation mode of the semiconductor device 200.

In a preferred example, the operation-mode determination portion 250 determines whether the semiconductor device 200 is in an operation mode that operates in a plurality of operation environments. The operation mode may be a test mode. For example, when a specific external terminal (not shown) is applied with a voltage (e.g., a negative voltage) which is not used in a normal operation, the semiconductor device 200 will be switched to the test mode and tested in a plurality of operation environments. Alternatively, when a test command is input to the input/output portion 210 of the semiconductor device 200, the semiconductor device 200 will be switched to the test mode and tested in a plurality of operation environments. Preferably, the test is performed before the semiconductor device 200 is shipped. Also, the test may be performed in the wafer state before the semiconductor chip is divided into monolithic pieces, or may be performed in a state in which the monolithic chip has been packaged. The operation-mode determination portion 250 is configured to determine the mode that is operated in a plurality of operation environments.

When the operation-mode determination portion 250 determines that the semiconductor device 200 is in a mode to operate in a plurality of operation environments, the operation-information acquisition portion 252 acquires operation information from the code generation circuit 230 and provides it to the virtual-code detection portion 254. The code generating circuit 230 is a circuit formed in the semiconductor device 200. When the semiconductor device 200 operates in a plurality of operation environments, the code generation circuit 230 outputs operation information (unique information) corresponding to the plurality of operation environments. For example, in the test mode, the code generation circuit 230 operates at different operation temperatures and/or different supply voltages and outputs the corresponding operation results as operation information.

Figure 2:
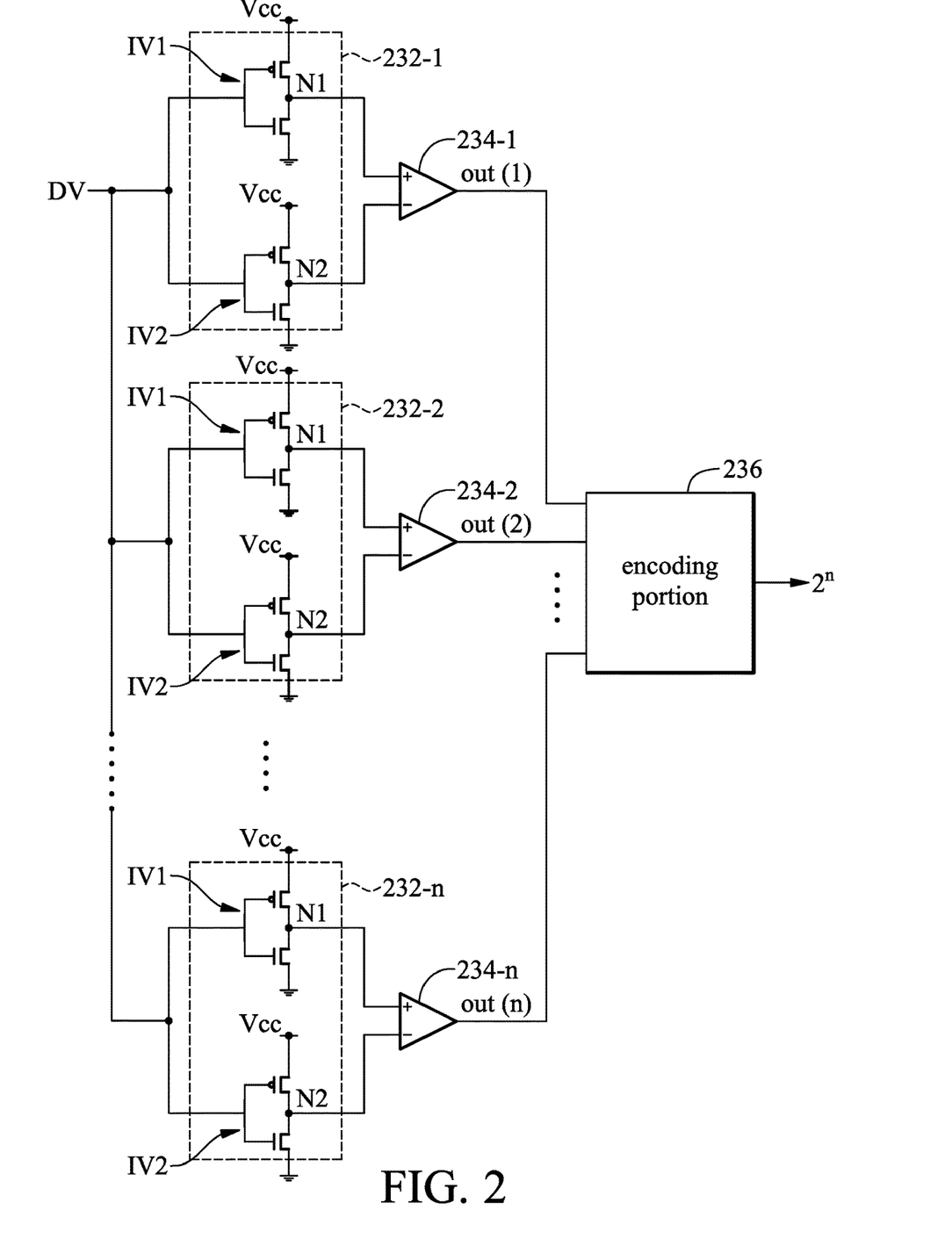
FIG. 2 shows an exemplary embodiment of a code generation circuit.

Here, an example of the code generation circuit 230 is shown in FIG. 2. The code generation circuit 230 may share a part or all of the circuits for implementing the functions of the semiconductor device 200, or may be provided exclusively.

The code generation circuit 230 has n sets of circuits for outputting n-bit operation information. As shown in FIG. 2, the code generation circuit 230 includes n sets of inverter circuits 232-1~232-$n$, each of which includes a pair of inverters IV1 and IV2, n sets of comparators (differential amplifiers) 234-1~234-$n$ which receive the outputs of the inverter circuits 232-1~232-2 respectively, and an encoding portion 236 which receives the output signals out(1)~out(n) of the n sets of comparators 234-1~234-$n$ and outputs n-bit operation information.

The power supply voltage Vcc is supplied to each pair of inverters IV1 and IV2, and the gates of these inverters IV1 and IV2 are commonly coupled to receive a driving signal DV. The voltage level of the driving signal DV is preferably half of the level of the power supply voltage Vcc. When the driving signal DV whose voltage level is equal to half of the level of the power supply voltage Vcc is input to the gates of one pair of inverters IV1 and IV2, the shoot-through current flowing through the inverters IV1 and IN2 is induced to serve as the leakage current. Since there is variation in the fabrication process of the transistors and well regions of the inverters IV1 and IV2, there is a slight variation in the thresholds of the transistors and the concentrations of the well regions, so that a slight variation is also induced in the leakage current flowing through the inverters IV1 and IV2. Each differential amplifier 234 compares the voltage of the corresponding output node N1 with the voltage of the corresponding output node N2 and outputs the data of the high (H) or low (L) voltage level according to the difference between the two voltages of the output nodes N1 and N2. The encoding portion 236 receives the output signals of the n-sets of differential amplifiers 234 and outputs n-bit operation information.

Figure 3A:
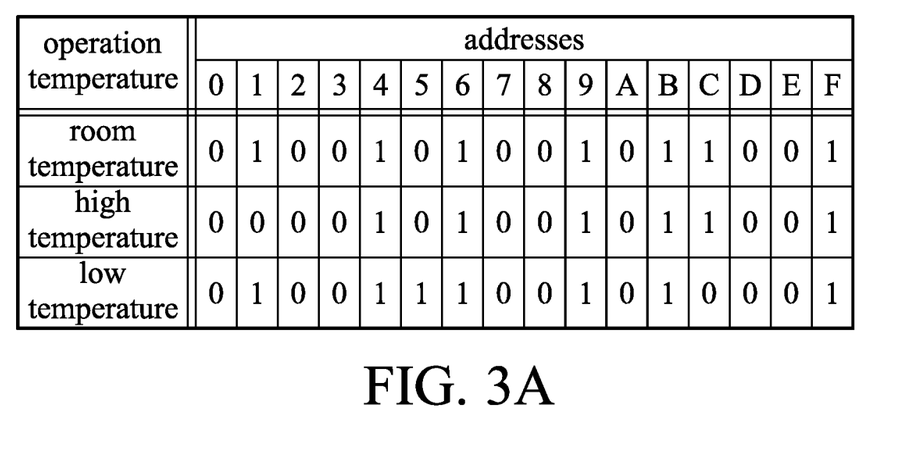
FIG. 3A shows a table of operation information generated by the code generation circuit.

As described above, the code generation circuit 230 can operate in a plurality of operation environments, and the encoding portion 236 outputs the respective operation information corresponding to the plurality of operation environments. FIG. 3A shows an exemplary embodiment of the operation information generated when the code generation circuit 230 operates at a plurality of operation temperatures. In the embodiment, three sets of the 16-bit operation information corresponding to hexadecimal addresses of 0 to F are generated when the code generation circuit 230 operates at room temperature, high temperature, and low temperature respectively. Since the operating characteristics of the transistors in the code generation circuit 230 are easily affected by the temperature change, the shoot-through current flowing through the inverters IV1 and IV2 of one of the inverter circuits 232-1~232-16 may be different from the shoot-through current flowing through the inverters IV1 and IV2 of another one of the inverter circuits 232-1~232-16. Moreover, the characteristic of the respective one of the differential amplifiers 234-1~234-16 may be different from the characteristic of the respective another one of the differential amplifiers 234-1~234-16 under these temperature conditions. Therefore, when the code generation circuit 230 operates at the room temperature, high temperature, and low temperature, the values of the bits of the respective operation information output by the encoding portion 236 are not necessarily all the same, that is, the value(s) of a part of the bits of the operation information at one temperature condition may be different from the value(s) of a corresponding part of the bits of the operation information at another one temperature condition. In the embodiment of FIG. 3A, the value of the bit at the address 1 of the operation information is "0" at the high temperature operation and "1" at the room temperature and the low temperature operation. The value of the bit at the address 5 of the operation information is "1" at the low temperature operation and "0" at the room temperature and the high temperature operation. In addition, the value of the bit at the address C of the operation information is "0" at low temperature operation and "1" at the room temperature and the high temperature operation.

Moreover, the plurality of operation environments are not limited to the change in the operation temperature, and also related to, for example, change in the power supply voltage Vcc. When the power supply voltage Vcc changes, since the operating characteristics of the transistors vary, the operation information output from the code generation circuit 230 may also change with the change in the power supply voltage Vcc. In addition, the plurality of operation environments can be referred to the changes in two references, both of the operation temperature and the power supply voltage Vcc.

Referring to FIG. 1, when the operation-information acquisition portion 252 acquires operation information corresponding to the plurality of operation environments from the code generation circuit 230, the virtual-code detection portion 254 detects the virtual codes from the acquired operation information. For example, in the operation information shown in FIG. 3A, there are stable bits whose values do not change even if the operation temperature changes, and there are bits whose values at one operation temperature are different from values at another operation temperature. Here, for clearly and conveniently description, in the operation information, a stable bit whose value does not change with the change of the operation environment is referred to as a "real code", and an unstable bit whose value varies at two different operation environments is referred to as a "virtual code".

The virtual code detection portion 254 obtains n-bit operation information and detects the unstable bit having different values under the operation environments in the obtained operation information. This detection may be performed by a logical operation. For example, an AND operation is performed on the values of a selected bit at a particular address of operation information generated in different operation environments. If the operation result is "1", the selected bit is referred to as a real code. This is because that the result of the AND operation is "1" only when all the values of the selected bit are "1", which indicates that the values of the selected bit of the operation information in different operation environments are identical.

On the other hand, when the result of the AND operation is "0", the selected bit may be referred to as a real code or a virtual code. That is, when all of the values of the selected bit in different operation environments are "0", the selected bit is a real code; when one of the values of the bit in different operation environments is not "0", the selected bit is a virtual code. For the further determination, in cases where the result of the AND operation is "0", an OR operation is further performed on the values of the selected bit. When the result of the OR operation is "0", the selected bit is referred to as a real code. When the result of the OR operation is "1", the selected bit is referred to as a virtual code because one of the values of the selected bit is "1".

Figure 3B:
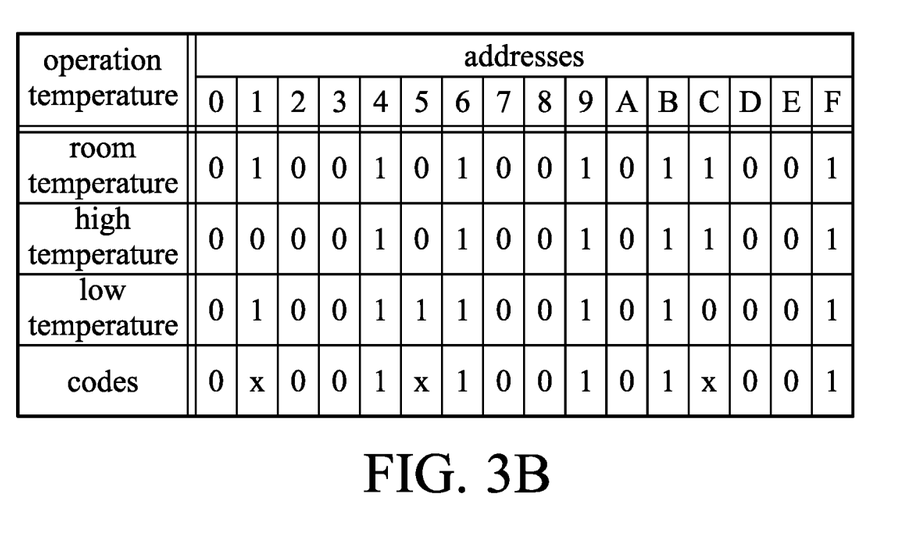
FIG. 3B shows a table of virtual codes obtained from operation information.

FIG. 3(B) shows the detection result of the virtual codes of the operation information of FIG. 3A on the lowest row "code", wherein each virtual code is represented by "x". As shown in FIG. 3B, the bits at the addresses 1, 5, and C whose values change with the change in the operation environment are unstable information, the bits corresponding the other addresses are real codes (stable information) whose values do not change with the change in the operation environment.

The code-information generation portion 256 generates the code information 242 based on the detection result of the virtual code detection unit 254. The code information 242 includes, for example, a coding line composed of real codes and virtual codes and identification information for identifying virtual codes in the coding line. For example, in the FIG. 3B, the code information 242 generated by the code-information generation portion 256 includes the coding line of "0x001x100101x001" and the address information 1, 5, C for identifying the virtual codes in the coding line. In addition, it should be noted that, in fact, one virtual code "x" will be designated as "0" or "1", and the code information is treated as binary information.

The code-information generation portion 256 stores the generated code information 242 in a region designated by a predetermined address in the nonvolatile memory portion 240 of the semiconductor device 200. The storage address of the code information 242 may be, for example, the address that is initially read when the semiconductor device 200 is powered up. Alternatively, the storage address of the code information 242 may be the address set by the user in the configuration register of the semiconductor device 200.

When the host device 100 in the security system 10 requests the code information 242, the code-information readout portion 258 reads the code information 242 from the nonvolatile memory portion 240 and outputs it to the host device 100. If the host device 100 requests the code information 242 after the code information 242 stored in the nonvolatile memory unit 240 is erased, the code-information readout portion 258 reads the operation information generated by the code-generation circuit 230 as code information 242 and provides the operation information to the host device 100.

The code-information erasing portion 260 responds to the command from the host device 100 and deletes the code information 242 stored in the nonvolatile memory unit 240 after the code information 242 has been stored in the host device 100.

Figure 4:
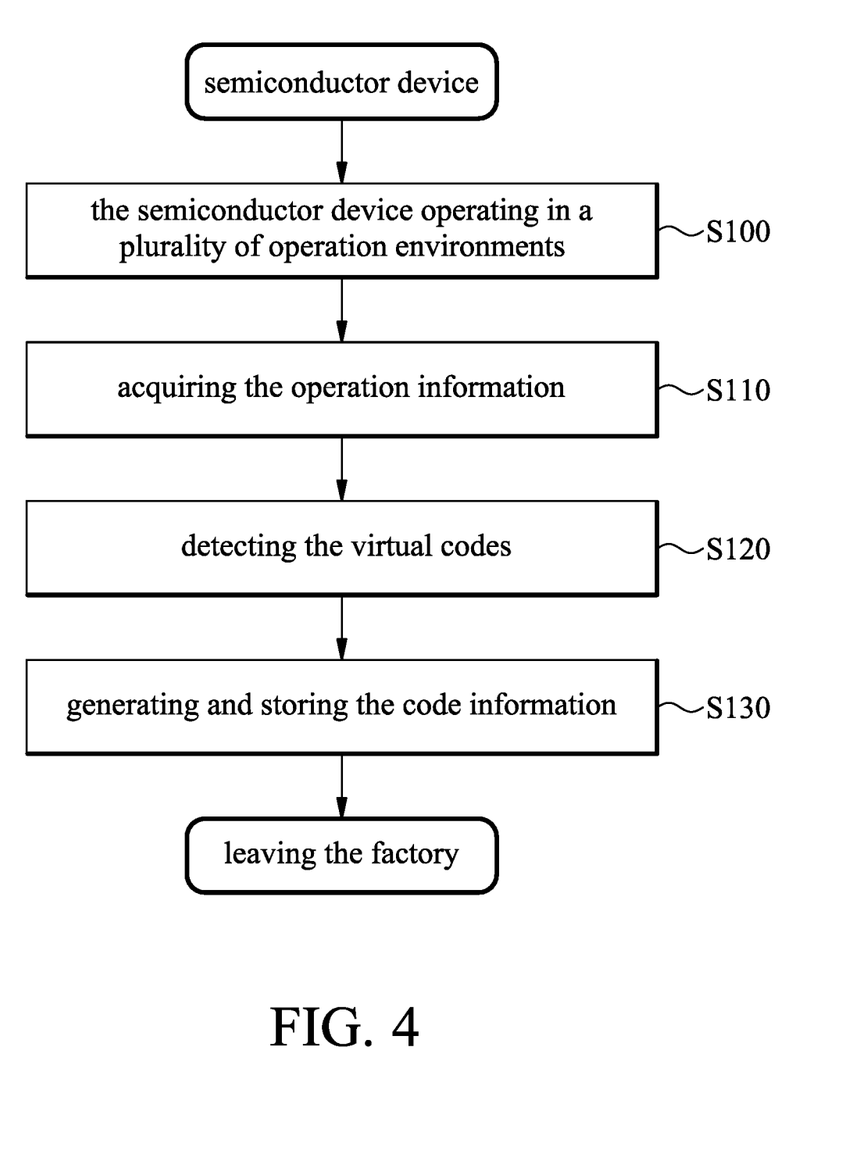
FIG. 4 shows a flow chart for generating code information before a semiconductor device leaves the factory.

Next, the operation of the security system of the present embodiment will be described. FIG. 4 shows an exemplary embodiment of a flow chart for generating code information before a semiconductor device leaves the factory. First, the semiconductor device 200 operates in a plurality of operation environments (S100), the operation-information acquisition portion 252 acquires operation information corresponding to the plurality of operation environments (S110), and the virtual-code detection portion 254 detects the virtual codes in the operation information (S120). The code-information generation portion 256 generates the code information 242 based on the detection result of the virtual code detection portion 254 and stores it in the nonvolatile memory unit 240 (S130).

Figure 5:
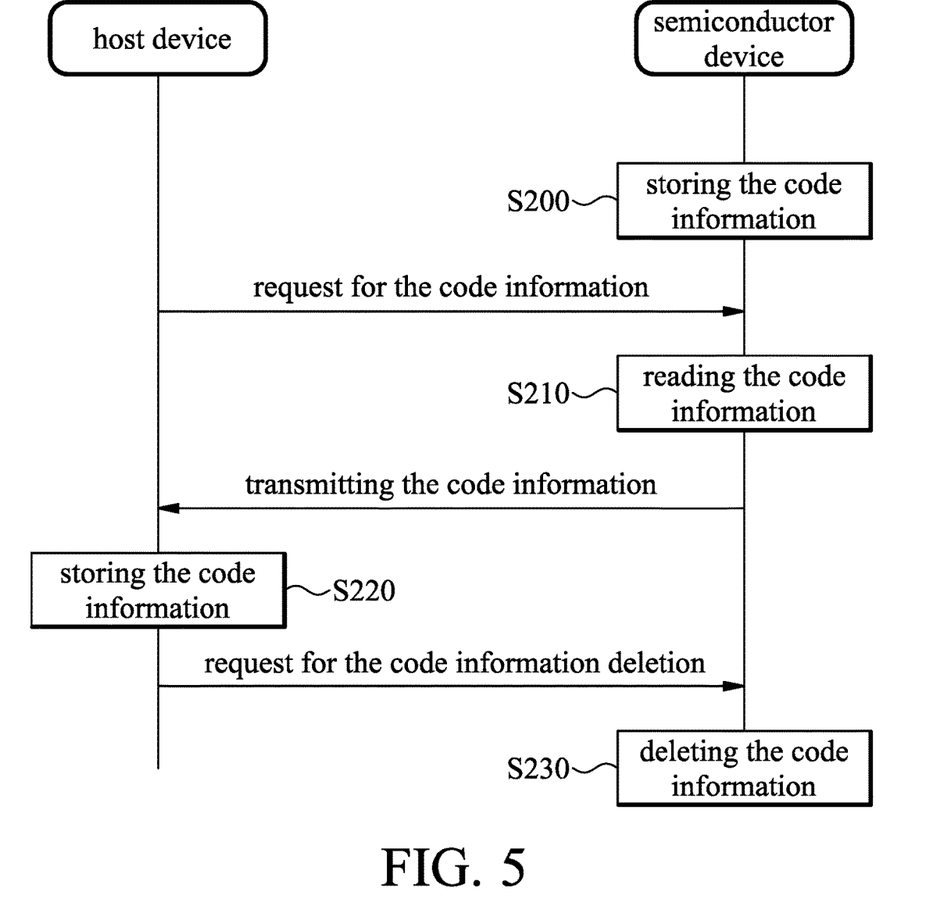
FIG. 5 shows an exemplary embodiment of a flow chart of an operation of a security system according to an exemplary embodiment.

Next, the authentication operation of the semiconductor device 200 by the host device 100 will be described. FIG. 5 shows an exemplary embodiment of an operation when the semiconductor device 200 is connected to the host device 100 for the first time. As described above, the semiconductor device 200 stores the code information 242 in the nonvolatile memory unit 240 before it leaves the factory (S200). When the host device 100 is connected to the semiconductor device 200 for the first time, the host device 100 executes a request for the code information 242 to the semiconductor device 200. In response to the request from the host device 100 for the code information 242, the code-information readout portion 258 of the semiconductor device 200 reads the code information 242 from the nonvolatile memory unit 240 (S210), and transmits the code information 242 to the host device 100 through the input/output portion 210.

Figure 6:
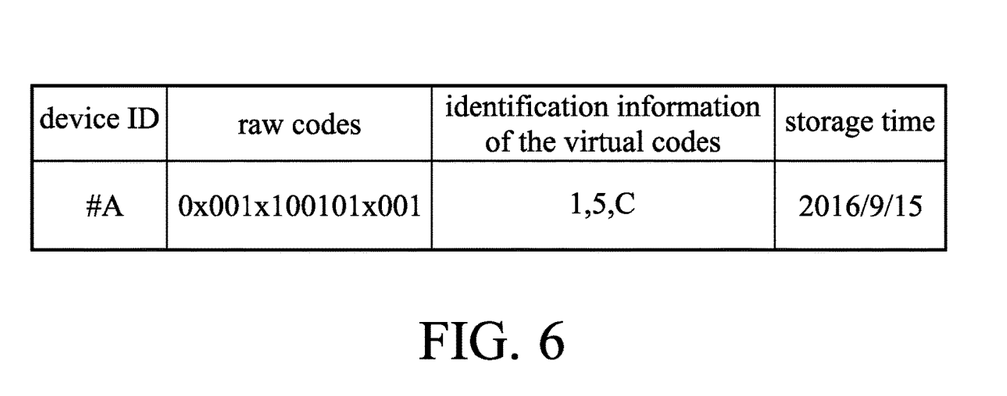
FIG. 6 shows a code information stored in a host device according to an exemplary embodiment.

Once the host device 100 obtains the code information 242, the host device 100 stores the code information 242 in the nonvolatile memory area of the host device 100 (S220). Preferably, as shown in FIG. 6, the host device 100 can store the code information 242 in association with a device related to a specific ID number (e.g., #A) of the semiconductor device 200. The code information 242 stored in the host device 100 includes the related specific ID number, the raw codes generated by the code-information generation portion 256, the identification information for identifying the virtual codes, and the storage time. For the example in FIG. 3B, the raw code is "0x001x100101x001" (x will actually be represented by "1" or "0"), the identification information of the virtual codes represents the addresses 1, 5, and C of the virtual codes.

Once the host device 100 has stored the code information 242 from the semiconductor device 200, the host device 100 requests the semiconductor device 200 to delete the code information 242. The code-information erasing portion 260 of the semiconductor device 200 responds to the request for the code information deletion to delete the code information 242 of the nonvolatile memory unit 240 (S230). Preferably, a deletion flag is generated when the code-information erasing portion 260 deletes the code information 242. After that, in cases where the code information 242 has been erased, when the host device 100 requests the code information 242 again, the code-information readout portion 258 reads the operation information generated by the code generation circuit 230 as code information by referring to the deletion flag and outputs the operation information to the host device 100.

In the example described above, the code-information erasing portion 260 may delete the code information 242 in response to the request for the code information deletion from the host device 100. However, in another embodiment, the code-information erasing portion 260 may automatically delete the code information 242 in respond to cases where the code-information readout portion 258 outputs the code information 242 to the host device 100.

Figure 7:
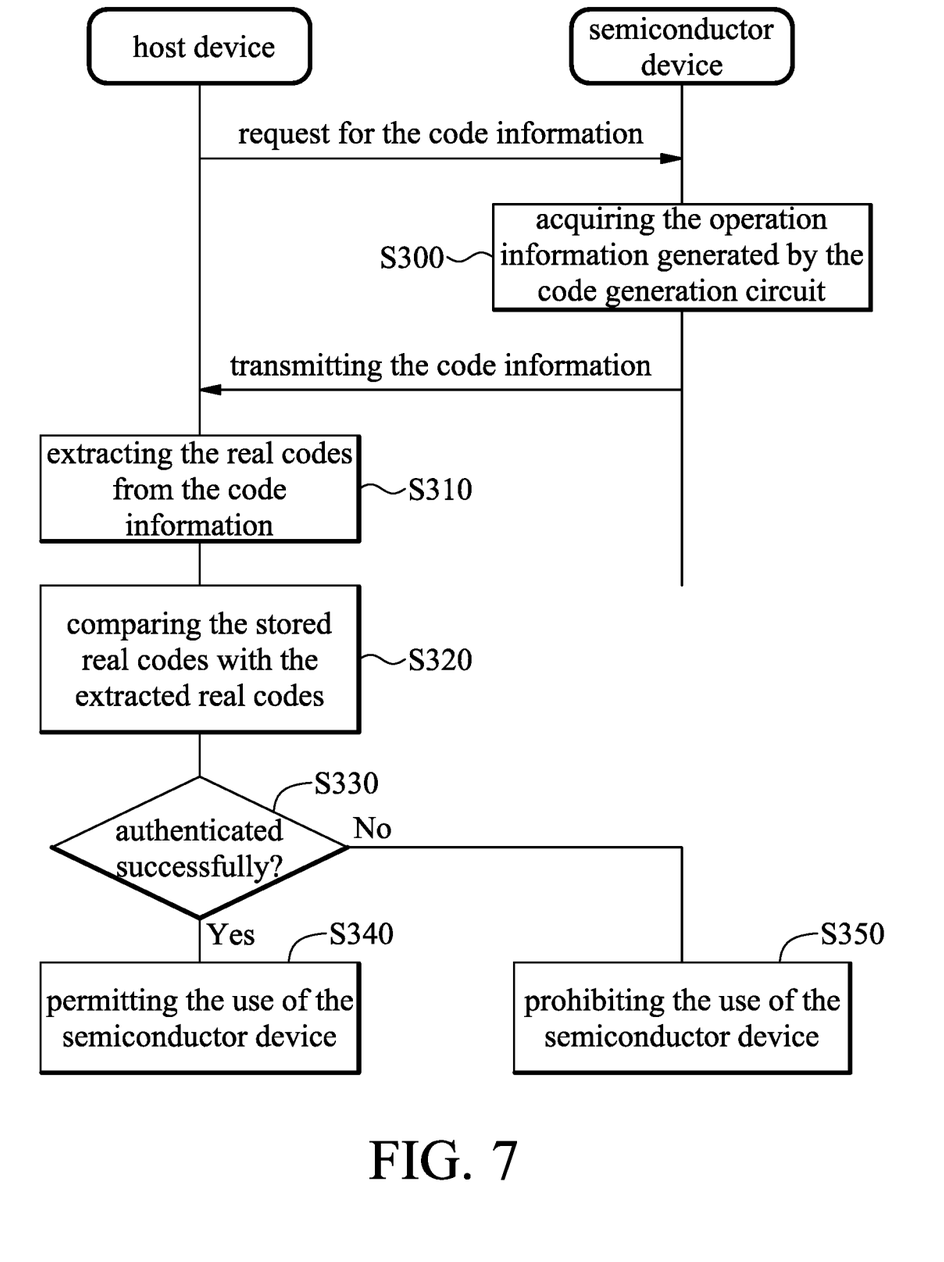
FIG. 7 shows a flow chart of an authentication operation of a security system according to an exemplary embodiment.

After the code information 242 of the semiconductor device 200 is deleted and stored in the host device 100, the authentication flow shown in FIG. 7 is performed. The host device 100 requests the semiconductor device 200 for code information again. The code-information readout portion 258 of the semiconductor device 200 has learned that the code information 242 of the nonvolatile memory unit 240 has been deleted by referring to the deletion flag and acquires operation information generated by the code generation circuit 230 through the operation-information acquisition portion 252 as the code information 242 (S300), and transmits the acquired code information to the host device 100.

The host device 100 extracts real codes other than the virtual codes from the received code information 242 based on the identification information of the virtual codes (referring to FIG. 6) (S310). For example, the bits specified by the addresses of the virtual codes are masked. Next, the host device 100 compares the stored real codes with the extracted real codes (S320) and authenticates the semiconductor device 200 as a real object if the stored real codes are identical with the extracted real codes. If the stored real codes are not identical with the extracted real codes, the semiconductor device 200 is not authenticated as a real object (S330). The host device 100 permits the use of the semiconductor device 200 when the semiconductor device 200 has been authenticated (S340), and prohibits or does not allow the use of the semiconductor device 200 when the semiconductor device 200 is not be authenticated (S350).

According to the security system of the present embodiment, the semiconductor device can be authenticated by unique information of the semiconductor device. In addition, since the unique information of the semiconductor device is deleted after being stored in the host device, the unique information cannot be known even if the semiconductor device is analyzed. Therefore, a more secure system can be constructed.

Next, a second embodiment of the present invention will be described. In the above-described embodiment, the host device 100 extracts the real codes based on the identification information of the virtual codes and takes all the extracted real codes as the comparison target. However, in the second embodiment, the host device 100 takes all or a part of the extracted real code as the comparison object.

Figure 8:
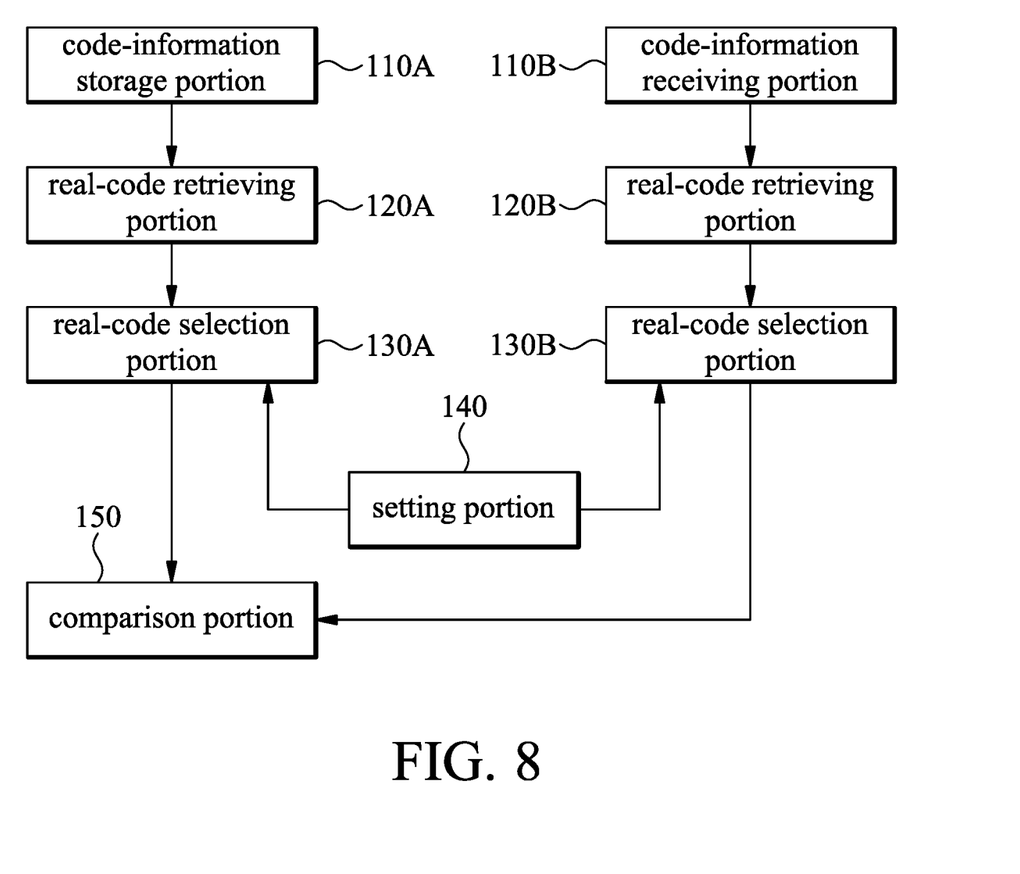
FIG. 8 is a block diagram of a security system according to a second exemplary embodiment.

FIG. 8 is a block diagram showing the functional configuration of the host device 100 according to the second embodiment. The host device 100 includes a code-information storage portion 110A, a real-code retrieving portion 120A, and a real-code selection portion 130A. The code-information storage portion 110A stores the code information as shown in FIG. 6. The real-code retrieving portion 120A retrieves the real codes based on the identification information of the virtual codes. The real-code selection portion 130A selects at least part of the real codes according to setting information set by a setting portion 140. Moreover, the host device 100 includes a code-information receiving portion 110B that receives code information from the semiconductor device 200, a real-code retrieving portion 120B that retrieves real codes from the received code information based on the identification information of the virtual codes, a real-code selection portion 130B that selects at least a part of the real codes based on the setting information set by the setting portion 140, and a comparison portion 150 that compares two real codes selected by the real-code selection portions 130A and 130B.

The setting portion 140 causes the real codes to be compared to change each time the semiconductor device 200 is authenticated or at every predetermined period, thereby make the real codes to be compared to keep in the randomness. In one example, the setting portion 140 can set a part of the retrieved real codes as a comparison object. For example, in the example of FIG. 3B, the 8-bit real codes corresponding to the address "2"-"4" and "6"-"A" are used as the comparison object. The selection of the real codes may be set, for example, in accordance with the input of the user or a predetermined sequence. In addition, at least a part of the retrieved real codes may be selected in accordance with the random numbers generated by the random-number generation portion.

In other examples, the setting portion 140 can change the order or combination of the retrieved real codes to form a real-code sequence to be compared. For example, the real codes may be arranged in ascending order of the addresses shown in FIG. 3(B), or on the contrary, the real codes may be arranged in descending order of the addresses. Alternatively, it is also possible to change the order of the retrieved real codes according to a predetermined sequence (for example, in the embodiment of FIG. 3B, a real-code sequence "100101100" to be compared is formed by the real codes corresponding to the addresses "6, 7, 8, 9, A, B, 4, 3, 2".

In addition, the setting portion 140 may change the combination of the retrieved real codes to constitute a real code sequence to be compared. For example, in the case of FIG. 3B, it is possible to use, for example, the combination of the real codes corresponding to the addresses "2-4, 6-8, D-E" or "0, 2-3, 7-A, D" to form a real code sequence to be compared. Further, the setting portion 140 may combine a plurality of real codes selected in accordance with the random numbers to form a real code sequence to be compared. In addition, a real code corresponding to the same address can be used repeatedly to be combined to form a real code sequence to be compared. For example, the real codes respectively corresponding to the addresses "0, 0, 2, 2, 4, 4, 4, A, A" to form a real code sequence "000011100" to be compared. In one embodiment, when it is desired to set the number of bits of the real codes to a predetermined length, a real code corresponding to the same address can be repeatedly used.

The setting information set by the setting portion 140 is provided to the real-code selection portions 130A and 130B, and the real-code selecting units 130A and 130B perform the selection operation of the real codes based on the setting information. Thus, according to the second embodiment, an advanced safety system can be obtained by changing the real codes at each authentication or at every predetermined period.

Although the conceptual structure of the semiconductor device is shown in the above embodiments, the semiconductor device may be, for example, a flash memory. The host device obtains specific code information from the flash memory for the authentication of the flash memory. In this case, the code-generation circuit 230 of the flash memory can utilize the page buffer/sense amplifier to read out a specific page of the memory cell array in a plurality of operation environments and make the encoded operation information to be read out from the page buffer/sense amplifier.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:
1. A security system comprising:
a semiconductor device comprising:
a unique-information generation circuit configured to operate in a plurality of operation environments to generate unique information, wherein the unique information comprises stable information and unstable information, the stable information is a constant in the plurality of operation environments, and the unstable information is different in at least two of the plurality of operation environments;
a controlling logic configured to detect the unstable information; and
a memory storing the unique information and also identification information for identifying the unstable information, wherein the controlling logic reads out the unique information and the identification information stored in the memory and outputs the unique information and the identification information; and
a host device, coupled to the semiconductor device, comprising:
a storage circuit storing the unique information and the identification information received from the memory of the semiconductor device; and
a processor receiving the unique information from the unique-information generation circuit of the semiconductor device,
wherein the processor further compares the stable information of the unique information stored in the storage circuit with the stable information of the unique information received from the unique-information generation circuit to authenticate the semiconductor device.

2. The security system according to claim 1, wherein the host device requests the semiconductor device to delete the unique information and the identification information stored in the memory after the unique information and the identification information are stored in the host device.

3. The security system device according to claim 2, wherein:
the processor retrieves the stable information from the unique information according to the identification information;
the processor selects at least one part of the stable information or changes an order of the stable information according to setting information, and
the processor compares the stable information of the unique information selected from the storage circuit with the stable information of the unique information selected from the unique-information generation circuit according to the identification information and the setting information.

4. The security system according to claim 3, wherein the processor randomly selects the retrieved stable information or arranges the order of the received stable information.

5. The security system according to claim 1, wherein the controlling logic is further configured to delete the unique information and the identification information which are stored in the memory.

6. The security system according to claim 1,
wherein the controlling logic is further configured to determine whether the semiconductor device operates in the plurality of operation environments, and
wherein the controlling logic is further configured to acquire the unique information from the unique-information generation circuit when the controlling logic determines that the semiconductor device operates in the plurality of operation environments.

7. The security system according to claim 1,
wherein the controlling logic is further configured to generate code information based on the detected unstable information, and
wherein the code information comprises a code sequence formed by the stable information and the unstable information and the identification information used to identify the unstable information of the code sequence.

8. The security system according to claim 1, wherein the unique-information generation circuit comprises:
n sets of inverter circuits, each of the n sets of inverter circuits comprising one pair of inverters,
n sets of comparators, each of the n sets of comparators compares output voltages output by the one pair of inventers in one of the n-sets of inverter circuits; and
an encoder circuit configured to receive comparison results of the n sets of comparators to generate the unique information, wherein the unique information generated by the encoding circuit has n bits.

9. The security system according to claim 8, wherein a voltage whose level is half of a level of a power supply voltage is supplied to gates of the one pair of inventers in one of the n-sets of inverter circuits.

* * * * *